Aug. 11, 1931. M. O. ROLSTAD 1,818,353
TOOL FOR GRASPING BOLTS AND MACHINE PARTS
Filed Oct. 7, 1929
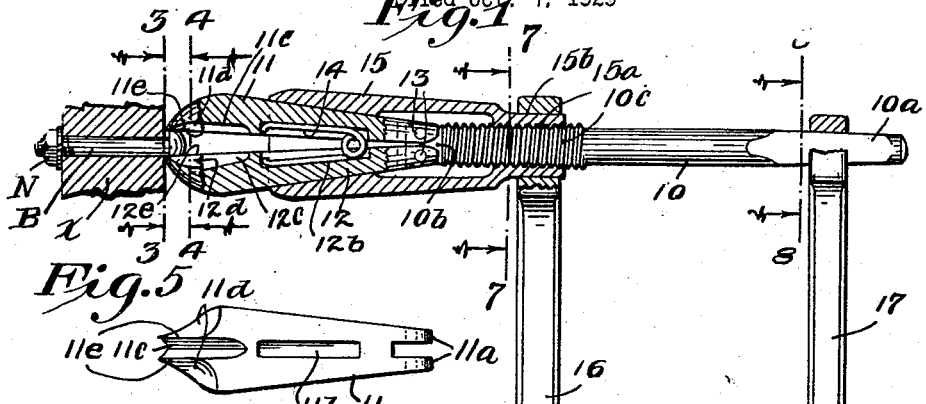
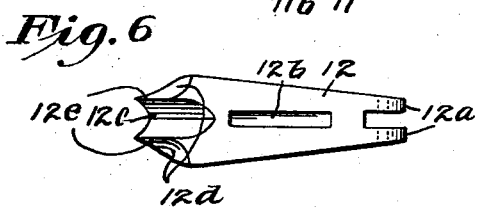
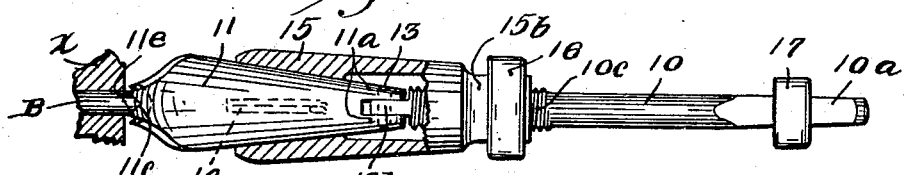
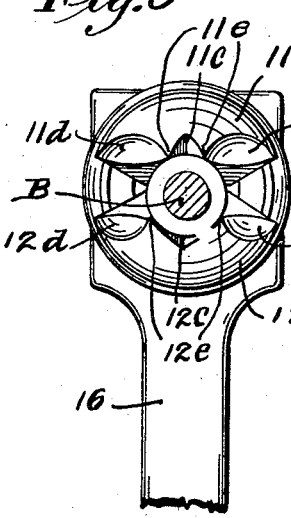
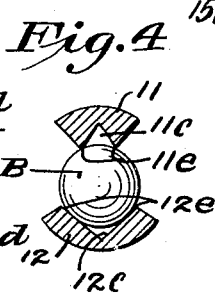
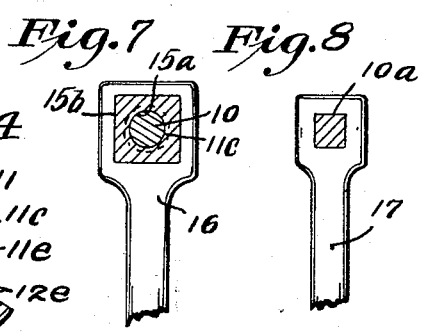
Inventor
Martin O. Rolstad
By his Attorneys
Williamson Reif & Williamson Patented Aug. 11, 1931

1,818,353

UNITED STATES PATENT OFFICE

MARTIN O. ROLSTAD, OF SISSETON, SOUTH DAKOTA, ASSIGNOR OF ONE-HALF TO OSCAR BORNES, OF MINNEAPOLIS, MINNESOTA

TOOL FOR GRASPING BOLTS AND MACHINE PARTS

Application filed October 7, 1929. Serial No. 397,920.

This invention relates to a tool for grasping and holding against rotation, small machine parts, such as bolts and other parts having circular heads or ends.

In many cases, it is necessary to hold a bolt against rotation in order to remove the nut or burr therefrom. This is especially true where the thread of the shank or burr is rusted or is slightly jammed. Tools commercially sold and known to me at this time are not adapted to grasp the circular end or head of a bolt or machine part to enable a jammed or rusted burr to be removed.

It is an object of my present invention to provide a simple, but highly efficient tool for securely grasping the circular heads or ends of small machine parts, such as bolts, to hold the parts against rotation for removal of nuts, burrs or other parts secured to the shank of the first mentioned part.

It is a further object to provide a grab tool for grasping, removing or replacing machine parts.

It is more specifically an object to provide a tool of the class above set forth, wherein a pair of specially constructed jaws may be positively secured to a circular bolt head or analogous part by means of longitudinal movement of a socket member, thereby securely holding the part against rotation.

These and other objects and advantages of the invention will be apparent from the following description made in connection with the accompanying drawings, wherein like reference characters refer to similar parts throughout the several views and wherein, Fig. 1 is a vertical section taken longitudinally through my grab tool operatively applied upon a bolt;

Fig. 2 is a top plan view of the same with some parts broken away and others shown in section;

Fig. 3 is a cross section taken on the line 3—3 of Fig. 1, showing an end elevation of my tool;

Fig. 4 is a cross section taken on the line 4—4 of Fig. 1 showing the cooperation of the clamping jaws in grasping the circular end of a bolt or machine part.

Figs. 5 and 6 are plan views of the inner surfaces of the two jaw members detached from the tool; and Figs. 7 and 8 are cross sections taken on the lines 7—7 and 8—8 respectively of Fig. 1.

As illustrated in the drawings, my improved tool includes a straight shank 10 having an outer end 10a of substantially square cross section and a flatted tongue 10b at its opposite extremity and an externally threaded portion 10c adjacent tongue 10b. A pair of cooperating grasping jaws 11 and 12 are pivoted at their inner ends by means of suitable pins 13 to tongue 10b and project outwardly from the tongue end of said shank. As shown in Figs. 4, 5 and 6, each of the jaws 11 and 12 are provided with bifurcated inner ends 11a and 12a respectively which straddle tongue 10b and through which pins 13 are inserted. Jaws 11 and 12 also have on their inner surfaces centrally disposed grooved spring retaining portions 11b and 12b extending longitudinally of the jaw members and a suitable spring 14 of the bow type, which may be constructed from a single piece of spring wire with the intermediate portion coiled to leave a pair of oppositely disposed jaw engaging arms, is interposed between pivoted jaws 11 and 12, the said arms being inserted in the spring receiving portions 11b and 12b of said jaws to urge said jaws apart. Jaws 11 and 12 have specially constructed grasping claws at their outer extremities which are adapted to cooperate to securely grasp a circular end or bolt head to hold the same against rotation. Said claws, as clearly shown in Fig. 1, are curved inwardly and oppositely in longitudinal cross section and on their inner faces are provided with inverted V-shaped grooves 11c and 12c, the material adjacent said grooves being recessed at 11d and 12d to provide sharp gripping edges 11e and 12e which extend longitudinally of the jaws. The groove 11c is of considerably smaller dimensions than groove 12c and consequently the gripping edges 11e are spaced closer together than the gripping edges 12e of jaw member 12 and when the jaws are closed together edges 11e will be disposed inwardly of gripping edges 12e. This arrangement of edges is found to greatly facilitate the positive gripping action of the jaws to prevent rotation of the circular part engaged, and also gives the tool an effective adjustment for grasping parts varying considerably in size.

A tubular socket member 15 surrounds the intermediate portions of jaws 11 and 12, having a tapered inner bore to effectively force the jaws together when socket 15 is moved longitudinally toward the outer ends of the jaws. The inner end of socket member 15 is somewhat diminished and is provided with an internal thread 15a which engages the threaded portion 10c of the shank 10. The external surface of the inner end 15b of socket 15 is made of square or polygonal shape to receive a hand wrench 16 and a second hand wrench 17 is adapted to engage the square end 10a of the shank 10.

In Figs. 1 and 2 of the drawings, the operation of my tool for removing a bolt B is shown secured to a bar X, said bolt having threadedly applied to one end thereof the nut N. The bolt is provided at its opposite end with the usual convex circular head, and the cooperating claws of my jaw members 11 and 12 are disposed at opposite portions of the head of the bolt. If necessary, the shank 10 of my tool may be struck at the end 10a to drive the ends of the jaws 11 and 12 slightly into the material of the bar X to permit the bolt head to be surrounded. The shank 10 is then held in non-rotative position by means of the wrench 17 and the socket 15 is turned in counter-clockwise direction by means of the wrench 16, thereby drawing the jaws 11 and 12 firmly together about the cylindrical bolt head. The sharp cooperating edges 11e and 12e press into the edge of the bolt head firmly grasping the same and preventing relative rotation between the jaws and the bolt. When the tool is properly secured, the bolt may be held against rotation by means of the wrench 17 and a wrench applied to the nut end and turned to remove the nut from its engagement with the threaded end of the bolt shank.

It will be clearly seen that the longitudinal and inward curvature of the claw portions of the jaws, together with the grooved portions 11c and 12c and the sharp closing edges 11e and 12e cause the tool to bite sharply against a circular edge or end of a machine part. By constructing the claw of jaw 11 of smaller proportions than the claw of jaw 12 the device is adaptable for grasping and holding bolt heads or the cylindrical ends of other machine parts varying considerable in diameter for some of the sharp edges of the two jaws will be caused to bite the peripheral of the part engaged.

It will also be apparent that my tool can also be applied and utilized for removing, replacing or positioning various machine parts where the non-rotative feature is not essential.

It will, of course, be understood that various changes may be made in the form, details, arrangement and proportions of the parts without departing from the scope of applicant's invention.

What is claimed is:

1. A tool for engaging and holding the round head of a bolt, comprising a straight shank having an outer end which may be struck to drive the tool longitudinally, a pair of opposed jaws pivoted to one end of said shank and extending substantially longitudinally therefrom, means interposed between said jaws for urging said jaws apart, a socket member surrounding the inner ends of said jaws and a portion of said shank, said socket member having engagement with said shank and being longitudinally adjustable thereon to clamp said jaws, said jaws being longitudinally curved and having longitudinally extending biting edges for gripping the round head of a bolt or other machine part, said jaws having pointed extremities adapted to be driven into material adjacent a bolt head.

2. A tool for engaging and holding the round head of a bolt or other machine part comprising a pair of opposed and elongated pivoted jaws, means for positively drawing said jaws together, said jaws terminating in oppositely and inwardly curved pointed ends having opposed longitudinally directed clamping surfaces, each of said clamping surfaces being provided with a pair of relatively sharp longitudinal biting edges, the biting edges of one of said jaws being spaced closer together than the biting edges on the opposite jaw for cooperation to positively hold the round head of a machine part.

In testimony whereof I affix my signature.

MARTIN O. ROLSTAD.